US010600338B2

(12) United States Patent
Kastner

(10) Patent No.: US 10,600,338 B2
(45) Date of Patent: Mar. 24, 2020

(54) METHOD AND APPARATUS FOR DEMONSTRATING OPTICAL PROPERTIES OF LENSES FOR SPECTACLE GLASSES

(71) Applicant: Carl Zeiss Vision International GmbH, Aalen (DE)

(72) Inventor: Peter Kastner, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 219 days.

(21) Appl. No.: 15/866,716

(22) Filed: Jan. 10, 2018

(65) Prior Publication Data

US 2019/0213916 A1    Jul. 11, 2019

(51) Int. Cl.
| | |
|---|---|
| *G09B 23/22* | (2006.01) |
| *G02B 30/25* | (2020.01) |
| *G02C 7/02* | (2006.01) |
| *G02C 7/12* | (2006.01) |
| *G02C 7/06* | (2006.01) |
| *G02C 13/00* | (2006.01) |
| *G02C 7/10* | (2006.01) |

(52) U.S. Cl.
CPC ............ *G09B 23/22* (2013.01); *G02B 30/25* (2020.01); *G02C 7/027* (2013.01); *G02C 7/061* (2013.01); *G02C 7/12* (2013.01); *G02C 13/005* (2013.01); *G02C 7/102* (2013.01)

(58) Field of Classification Search
CPC ........ G09B 23/22; G02B 27/26; G02C 7/027; G02C 7/061; G02C 7/12; G02C 13/005
USPC ...................................... 351/159.75
See application file for complete search history.

(56) References Cited

U.S. PATENT DOCUMENTS

| | | | | |
|---|---|---|---|---|
| 4,541,534 | A | * | 9/1985 | Strauss .................. A47F 7/021 211/194 |
| 6,228,289 | B1 | * | 5/2001 | Powers ............ B29D 11/00442 264/1.36 |
| 2008/0212007 | A1 | * | 9/2008 | Meredith ............... G02C 7/083 349/139 |
| 2018/0120198 | A1 | * | 5/2018 | Glasenapp ......... G01M 11/0207 |
| 2019/0086691 | A1 | * | 3/2019 | Lappe ................... G02C 7/027 |

* cited by examiner

*Primary Examiner* — James R Greece
(74) *Attorney, Agent, or Firm* — Thrive IP®; Georg M. Hasselmann

(57) ABSTRACT

A method and an apparatus for demonstrating optical properties of a lens for spectacle glasses are disclosed. A demonstrational tool exposes a spectacle lens or a pair of spectacle glasses to polarized light to demonstrate how the removal of polarized, reflected light from a display reduces glare. Further, the demonstrational tool exposes a phototrope lens or a pair of spectacle glasses with phototrope lenses to UV- or HEV-light to demonstrate the reversible self-tinting of the phototrope lenses.

16 Claims, 6 Drawing Sheets

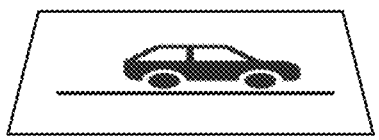
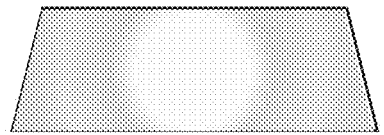
FIG. 8A                FIG. 8B
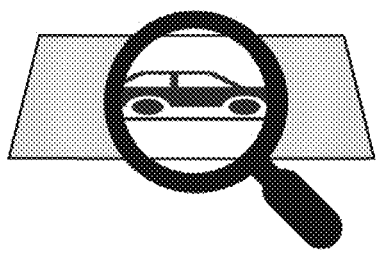
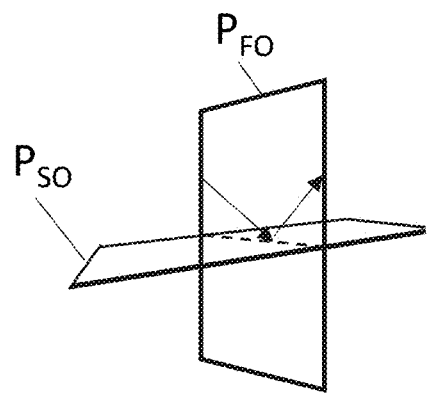
FIG. 8C                FIG. 9

METHOD AND APPARATUS FOR DEMONSTRATING OPTICAL PROPERTIES OF LENSES FOR SPECTACLE GLASSES

TECHNICAL FIELD

The disclosure relates to a method and an apparatus for demonstrating optical properties of a spectacle lens for a pair of spectacle glasses to an observer. A demonstration tool including a light source emitting visible light and at least one of ultraviolet light (UV-light) and high-energy visible light (HEV-light) is provided, which exposes a spectacle lens to light emitted by the light source to demonstrate an optical property of the spectacle lens.

BACKGROUND

It is known to provide optical glasses to correct for ametropia of the human eye, such as myopia, hyperopia, or astigmatism. Further, optical glasses may be provided to limit the exposure to light, for example in sunglasses, which may or may not correct for ametropia of the human eye. Similarly, optical glasses may be provided with polarizers to reduce glare from reflecting surfaces, such as a body of water or a wet road.

Customers have now more choices than ever to purchase eyewear that is customized to their individual needs and preferences. With the increase in choices, the complexity of selecting eyewear increases, too. Moreover, there are various external parameters that need to be taken into account when selecting optimal glasses. For example, spectacle glasses should not only manifest the wearer's aesthetic preferences, but must also be suitable for the viewing habits and the lifestyle of the wearer. Thus, it becomes more difficult for a customer to select spectacle glasses that not only correct the customer's vision, but which also accommodate the customer's lifestyle.

Conversely, it is also becoming more complex to recommend spectacle lenses to a customer. For example, an ophthalmologist or optometrist is not only tasked with determining the refractive error of the eye, but also with taking into account external parameters, such as viewing habits, when recommending a particular type of spectacle lens. What is more, when selecting a spectacle lens, different customers may prefer explanations with different levels of detail about the underlying optical properties of a spectacle lens that make the spectacle lens particularly suitable for them.

SUMMARY

It is an object of the present disclosure to demonstrate to a customer during an eyeglass consultation how an optical property of a spectacle lens for a pair of spectacle glasses improves the customer's vision under different lighting conditions.

According to an aspect of the disclosure, a method of demonstrating an optical property of a spectacle lens comprises: 1) providing a demonstrational tool including a light source, 2) exposing a spectacle lens to light emitted by the light source, 3) absorbing a portion of the light emitted by the light source, and 4) comparing an optical property of the spectacle lens before the exposure to the light emitted by the light source with the optical property of the spectacle lens during or after the exposure to the light emitted by the light source.

According to another aspect of the disclosure, a demonstrational tool for demonstrating an optical property of a spectacle lens is disclosed, the demonstrational tool comprising: 1) a closable compartment, 2) a slot for at least one of a spectacle lens or a pair of spectacle glasses, the slot being arranged within the closable compartment, 3) a light source emitting visible light and at least one of UV-light or REV-light and being arranged within the closable compartment, and 4) a reflective surface arranged within the closable compartment and being configured to display at least one of an image and an animation, wherein the slot is arranged to expose the spectacle lens or the pair of spectacle glasses to the at least one of UV-light or HEV-light when the spectacle lens or the pair of spectacle glasses is placed on or in the slot and the closable compartment is closed, wherein the light source is arranged to reflect the visible light off of the reflective surface when the closable compartment is open, and wherein the reflected light contains more of the visible light emitted by the light source being polarized in a first orientation than the visible light emitted by the light source in a second orientation being perpendicular to the first orientation.

BRIEF DESCRIPTION OF THE DRAWINGS

The disclosure will now be described with reference to the drawings wherein:

FIG. 8A shows an image displayed on reflective surface 440;

FIG. 8B shows reflective surface 440 when light source 450 is turned on;

FIG. 8C shows a polarizer in the beam path between reflective surface 440 and observer 550; and FIG. 9 shows the plane of polarization $P_{FO}$ of light reflected off of the reflective surface 440.

DESCRIPTION OF EXEMPLARY EMBODIMENTS

Figure 1:
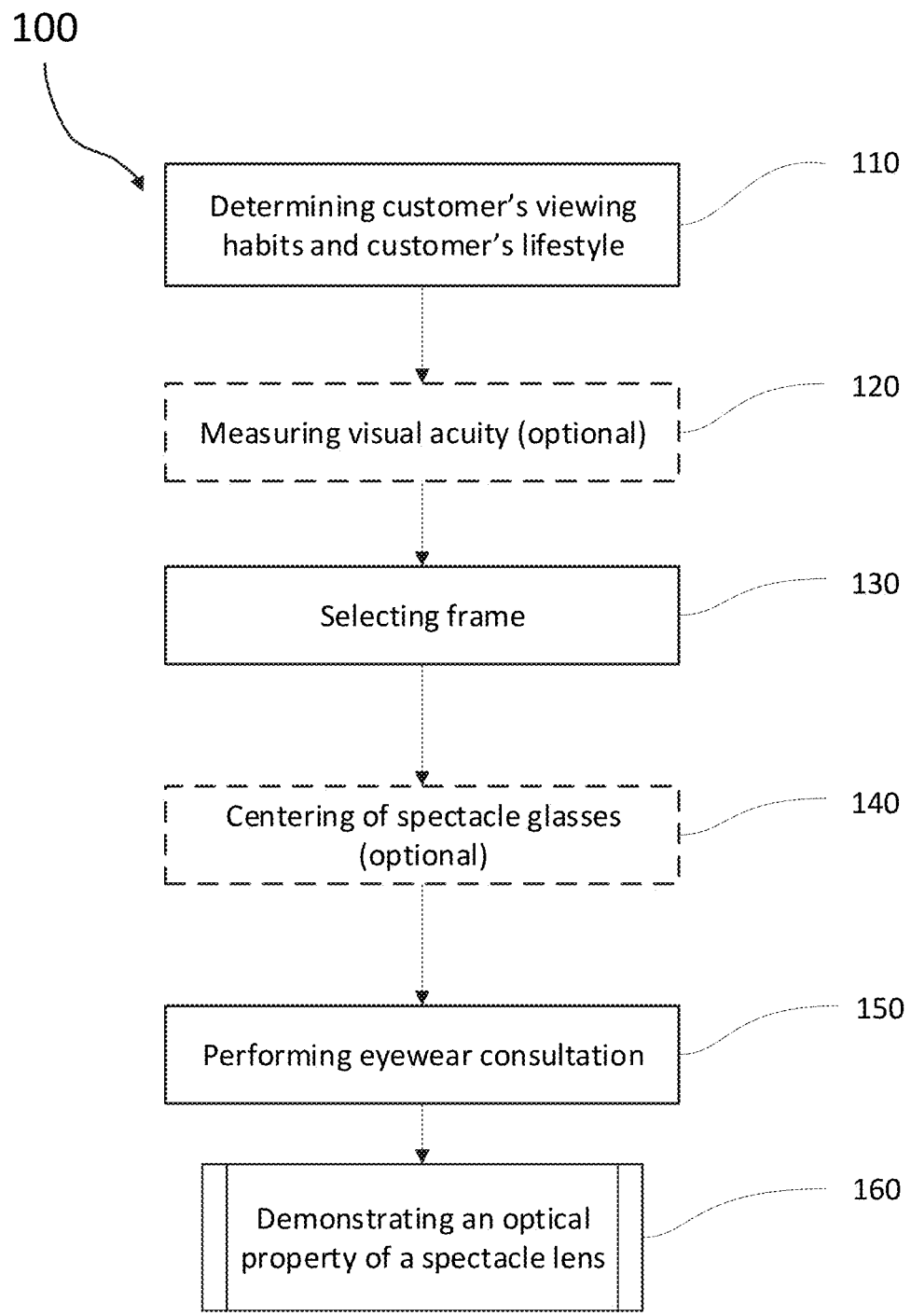
FIG. 1 shows an exemplary embodiment of a method of demonstrating an optical property of spectacle lenses.

In a typical embodiment, the spectacle lens comprises a phototrope component. Also typically, the portion of the light emitted by the light source includes at least one of ultraviolet light (UV-light) and high-energy visible light (HEV-light), wherein the phototrope component absorbs the portion of the light emitted by the light source.

In another typical embodiment, the phototrope component decreases a transmission of the spectacle lens when the portion of the light emitted by the light source is absorbed. In yet another typical embodiment, the optical property demonstrated to the customer is the transmission of the spectacle lens.

In a particular embodiment, the spectacle lens comprises a polarizer. In another particular embodiment, the light emitted by the light source is visible light. With particularity, the portion of the light that is absorbed is the visible light being polarized in a first orientation. Also with particularity, the polarizer absorbs more of the light emitted by the light source being polarized in the first orientation than the light emitted by the light source in a second orientation being perpendicular to the first orientation.

In a typical embodiment, the demonstrating tool further comprises a reflective surface. Also typically, the light emitted by the light source is reflected off of the reflective surface before being absorbed by the polarizer. Even more typically, at least one of a still image and an animation is displayed on the surface. In another typical embodiment, the surface reflects light being polarized in the first orientation.

In a particular embodiment, a method of providing customized eyewear to a customer includes: 1) determining at least one of a customer's viewing habits and a customer's lifestyle, 2) providing a selection of spectacle frames, 3) letting the customer select a spectacle frame, and 4) performing an eyeglass consultation, the eyeglass consultation including: i) demonstrating the optical property of the pair of spectacle glasses.

In another typical embodiment, the method of providing customized eyewear to a customer further includes at least one of: i) measuring a visual acuity of the customer, and ii) centering a spectacle lens for the selected spectacle frame.

In yet another typical embodiment, the demonstrational tool further comprises a safety switch configured to turn off the high-energy light when the closable compartment is opened. With particularity, the reflective surface is a display screen. Also with particularity, the display screen is configured to reflect more light polarized in the first orientation than light polarized in the second orientation.

In a particular embodiment, the demonstrational tool further comprises an inspection window for observing the spectacle lens or the pair of spectacle glasses when the spectacle lens or the pair of spectacle glasses is arranged on or in the slot and the closable compartment is closed. In another particular embodiment, the inspection window transmits at least some visible light and blocks the at least one of the UV-light or the HEV-light. In yet another typical embodiment, the demonstrational tool further comprises a timer for turning off the at least one of the UV-light or the HEV-light after a pre-determined period of time.

Turning to the drawings, FIG. 1 shows a flowchart of an exemplary embodiment of a method 100 of providing customized eyewear to a customer. Initially, an ophthalmologist or optometrist, which are hereinafter collectively referred to as eyecare professionals, will begin the consultation with a discussion about the customer's viewing habits and/or the customer's lifestyle, as noted in step 110 of the flowchart 100. For example, to determine the viewing habits, the eye care professional may inquire, for example, into the situations in which the customer typically needs glasses, such as reading, working on a computer, or driving a vehicle. With regard to the customer's lifestyle, the eyecare professional may inquire, for example, whether, how often, and what kinds of sports the customer plays.

In step 120, the eyecare professional determines the visual acuity of the customer. However, the customer may also provide an eyeglass prescription that was previously determined by the same or a different eyecare professional. In another exemplary embodiment, step 120 is optional and no determination of the visual acuity takes place, such as in the case of a customer with emmetropic vision who wants to purchase a pair of sunglasses without corrective glasses.

Thereafter, the customer can select one or more spectacle frames in step 130. At this point, the eyecare professional may consult if the selected frames are compatible with the customer's viewing habits and the customer's lifestyle. The selection of frames is not limited to model frames being stored on site, but may also be made from a virtual selection.

If the spectacle lenses are prescribed to correct an ametropia of the customer's eye or eyes, the eyeglass professional obtains the centration of the glasses for the customer in step 140. However, like step 120, this step may be optional in some exemplary embodiments.

In step 150, the eyecare professional performs an eyeglass consultation in which the customer is informed about the various properties and benefits of particular spectacle glasses. As part of the eyeglass consultation, the eyecare professional may perform the substep 160 of demonstrating the optical properties of spectacle glasses to the customer.

Figure 2:
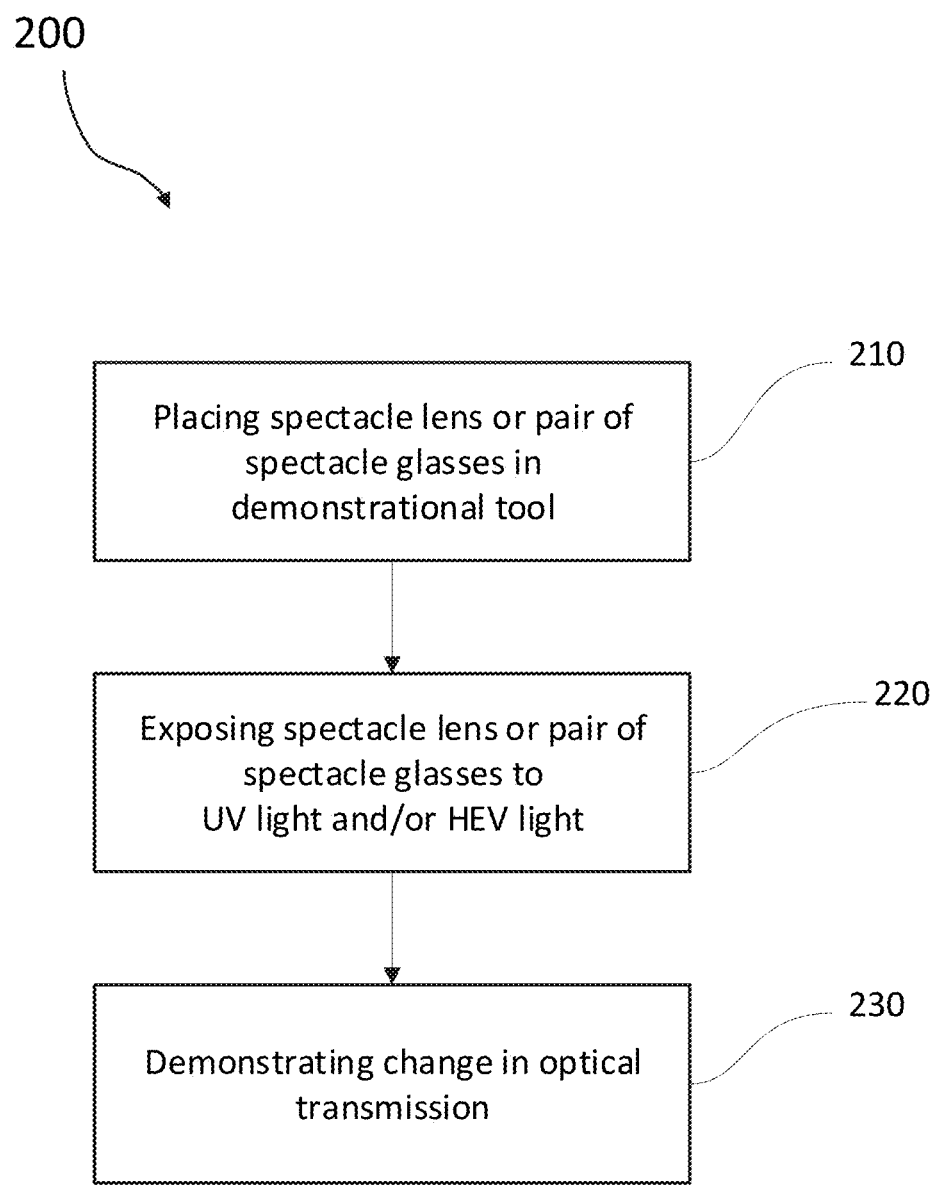
FIG. 2 shows an exemplary embodiment of a method of demonstrating how the transmission of phototrope spectacle lenses changes when exposed to UV or HEV-light.

An exemplary embodiment of demonstrating the optical properties of a spectacle lens or a pair of spectacle glasses is illustrated in FIG. 2, which shows the demonstration 200 of the optical properties of self-tinting (phototrope) spectacle glasses. Self-tinting glasses are glasses that darken reversible when worn in sunlight to protect the eyes from the sun and solar UV light while giving excellent vision. When the light conditions change, for example when the sun is covered by clouds or the wearer goes indoors, the self-tinting spectacle glasses become lighter and return to their initial tint to allow the wearer to once again see optimally under the changed light conditions.

However, the eyeglass consultation typically takes place indoors and there is ordinarily not enough high-energy light (UV-light or REV-light) available to trigger the self-tinting process. The eyecare professional may nonetheless demonstrate the self-tinting process by placing a pair of spectacles with self-tinting glasses in a demonstrational tool (step 210), such as demonstrational tool 400 shown in FIGS. 4A and 4B. In a particular embodiment, a self-tinting model glass 700, i.e., a single spectacle lens in a holder, may also be placed in the demonstrational tool. In another particular embodiment, a self-tinting model glass may be placed on or in the slot side-by-side to a model glass that is not self-tinting during exposure to high-energy light.

Once a model glass with a spectacle lens, a spectacle lens, or a pair of spectacle glasses is placed inside the demonstrational tool, a light source that emits at least one of UV-light or REV-light is turned on for a pre-determined period of time. In a typical embodiment, the light source is turned on for a time period of 30 seconds to 60 seconds. During the exposure to the high-energy light, the model glass with the self-tinting spectacle lens, the self-tinting spectacle glass, or the pair of spectacle glasses comprising self-tinting spectacle lenses begin to darken as a result of a reversible structural change of photo-active molecules, i.e., the phototrope component, contained in the self-tinting glasses. The model glass, spectacle lens, or pair of spectacle glasses may then be shown to the customer to demonstrate how quickly the tint changes and how the self-tinting glasses look in the tinted state. The customer can then determine, for example, if the combination of tinted glasses and the selected frame has a desirable appearance. However, it may also be that a customer does not like how the tinted glasses look with the selected frame and either select a different frame or self-tinting glasses that have a lighter or darker tint after exposure to high-energy light. Once, the exposure to the high-energy light is over, the model glass, self-tinting spectacle lens, or pair of spectacle glasses begin to return to their initial state, which is also demonstrated to the customer. Typically, it takes about 5 minutes to 10 minutes for the model glass, self-tinting spectacle lens, or pair of spectacle glasses to return to their initial state.

Figure 3:
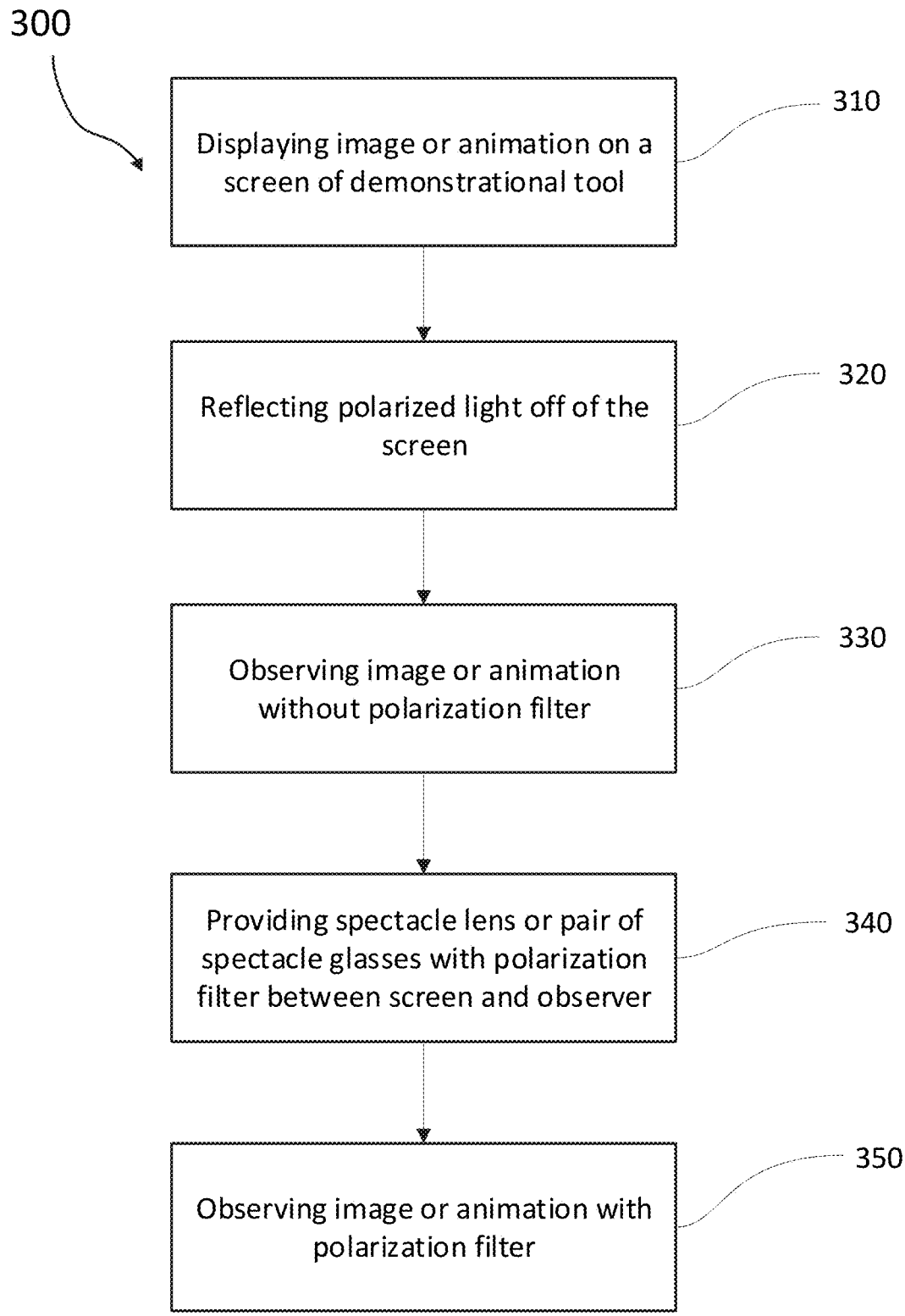
FIG. 3 shows an exemplary embodiment of a method of demonstrating the benefits of a spectacle lens having a polarizer.

Another exemplary embodiment of demonstrating the optical properties of a model glass, spectacle lenses or pair of spectacle glasses is illustrated in FIG. 3, which shows method 300 of demonstrating optical properties of spectacle lenses with polarizers or pair of spectacle glasses with polarizers. Polarizers are optical components that may be provided as a filter on a model glass, spectacle lens, or pair of spectacle glasses. Specifically, polarizers preferentially block light that is polarized in a first orientation and transmit some or all of the light that is polarized in a second orientation being perpendicular to the first orientation. Light with a polarization that is in between the first and the second orientation is partially blocked and partially transmitted. The closer the orientation of the polarized light is to the first orientation, the more of the polarized light is blocked.

In step 310 of the exemplary embodiment shown in FIG. 3, an image or an animation is displayed on a surface that is capable of reflecting at least some visible light. In a particular embodiment, an image, such as a car on a wet road, is printed on the reflective surface. In another particular embodiment, the reflective surface is a computer display for displaying a static image or an animation (an animated scene, such as a car driving on a wet road). The image or animation is shown to the customer. An exemplary embodiment of an image shown to the customer can be seen in FIG. 8A.

When a light source emitting visible light is turned on in step 320, some of the light is reflected off of the reflective screen towards the customer. The reflection is seen by the customer in step 330 as a bright spot on the image or the animation and makes it more difficult or even impossible to see the image or animation. An exemplary embodiment of an image obscured by a reflection can be seen in FIG. 8B. This step of the demonstration is equivalent to the customer's experience when driving a vehicle and seeing a reflection of a light source, such as the sun or the headlights of an approaching car off of a reflective surface, e.g., a wet road.

Incoming unpolarized light that is reflected off of a reflective surface becomes predominantly polarized within a plane that contains the incoming and the reflected light ray (plane $P_{FO}$ in FIG. 9). This plane is perpendicular to the reflective surface. The effect is most pronounced for a particular angle, the Brewster's angle, the numerical value of which depends on the ratio of refractive indices of the reflective surface and, in this case, air. Typically, the light source emitting the visible light to be reflected off of the surface is arranged such that the customer sees the reflection at an angle close or identical to the Brewster's angle.

Once the customer has seen the image or the animation with the reflection, the eyecare professional hands the customer in step 340 a model glass 700, a spectacle lens, or a pair of spectacle glasses 600 with a polarizer 540. The polarizer is arranged to block light being polarized in the first orientation. Thus, the reflected light from the light source is almost completely or completely blocked by the polarizer. As a result, the customer can see the image or the animation displayed on the reflecting surface in step 350 without the reflection of the visible light emitted by the light source. An exemplary embodiment of an image as seen by a customer with a polarizer can be seen in FIG. 8C. In this manner, the eyecare professional can demonstrate to the customer how the polarizer can improve the customers visual perception, for example in a scenario when the customer could be irritated by reflected light, such as seeing the headlights of an oncoming vehicle on a wet road. Specifically, the customer can experience how the polarizer reduces distracting glare and reflections while driving a vehicle.

Figure 4A:
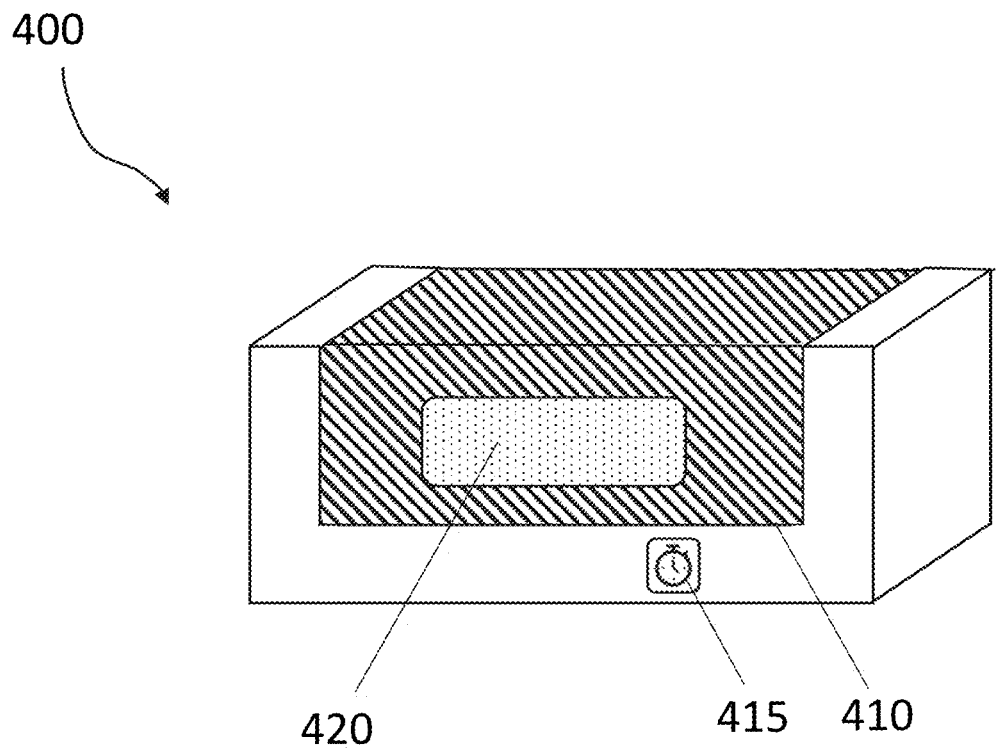
FIG. 4A shows demonstration tool 400 with lid 410 closed.
Figure 4B:
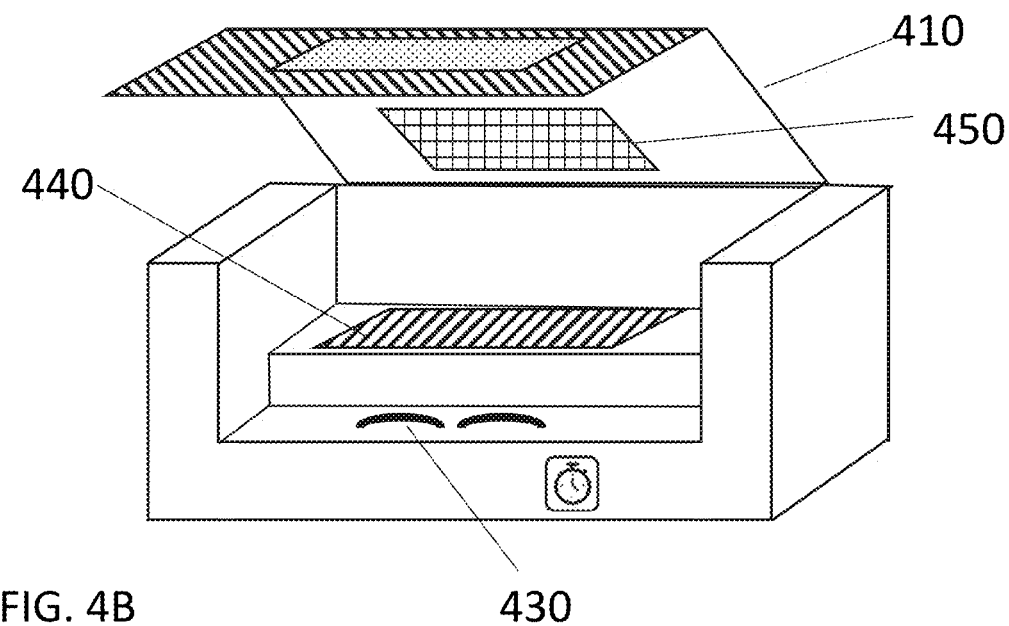
FIG. 4B shows demonstrational tool 400 with lid 410 opened.

FIG. 4A shows demonstrational tool 400 configured to perform any one of the methods, 160, 200, or 300, shown in FIG. 1, 2, or 3, respectively. In particular, FIG. 4A shows the demonstrational tool 400 with lid 410 closed. Inspection window 420 allows to observe the inside of the compartment enclosed by lid 410, for example when a pair of eyeglasses is placed within the compartment. As shown in FIG. 4B with lid 410 in an open position, a slot 430 for holding a model glass or a pair of spectacle glasses is arranged within the compartment of demonstrational tool 400. Further, the compartment includes a reflective surface 440, as well as a light source 450. In a typical embodiment, the reflective surface 440 is a still image printed on a panel, such as a glossy photograph. In another typical embodiment, a transparent plate is placed over an image to be viewed, such that the transparent plate reflects light polarized in the first direction. In yet another typical embodiment, the reflective surface 440 is a display screen on which a digital image or an animation can be displayed. Also typically, the inspection window 420 blocks high-energy light (UV-light and/or HEV-light) and transmits lower energy visible light. Thus, the observer can see the changing tint of the self-tinting glasses in the compartment without being exposed to high-energy light. When the lid is opened while the high-energy light source is still on, safety switch 560 shown in FIG. 5 automatically shuts down the high-energy light source. Timer 415 is provided to turn on the light source 450 or 450' for a predetermined period of time, typically between 30 seconds and 60 seconds. However, the timer can also be set for a shorter or a longer period of time. In an exemplary embodiment, the timer 415 is located on the demonstrational tool as shown in FIGS. 4A and 4B. In another exemplary embodiment, the timer is provided with and controlled through the display screen on which the digital image or the animation can be displayed.

FIG. 4B shows light source 450 for emitting visible light and high-energy light, i.e., at least one of UV-light and HEV-light. However, it is also possible to provide two or more light sources, where each individual light source is capable of emitting at least one of UV-light, HEV-light, and visible light. In the exemplary embodiment shown in FIG. 5, a second light source 450' emitting high-energy is arranged in the lid 410, such that the light source 450' is directly above slot 430 when the lid is closed. As further shown in FIG. 4B, the reflective surface 440 becomes visible to an observer with the lid 410 being out of the line of sight. In the open position of lid 410, a spectacle lens or a pair of spectacles can be placed in or on slot 430 or removed therefrom.

Figure 5:
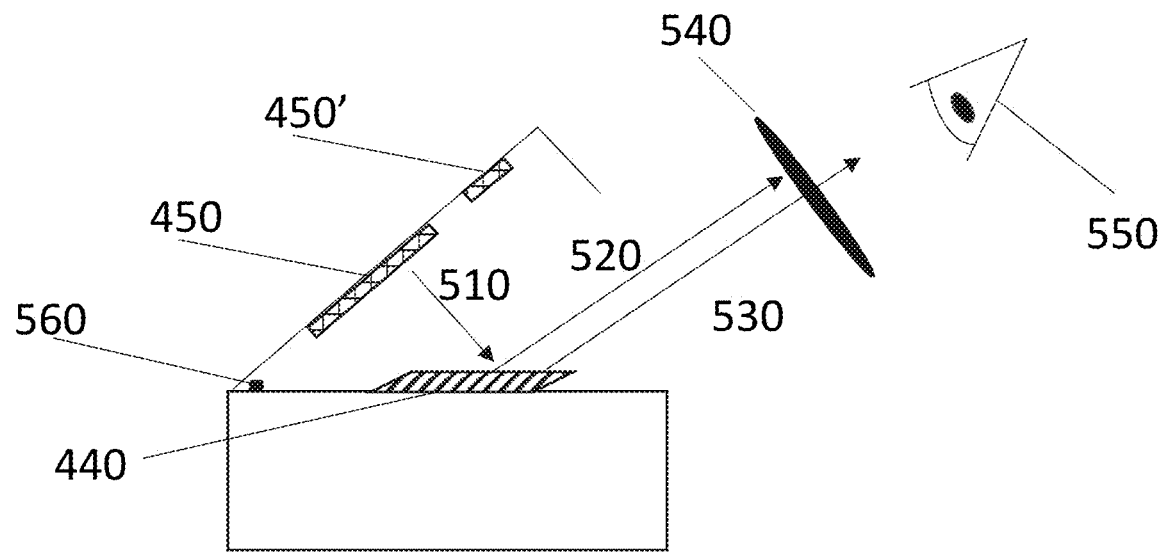
FIG. 5 shows a schematic for demonstrating the benefits of a spectacle lens having a polarizer.

FIG. 5 shows a side view of the demonstrational tool with the lid 410 in the open position. Safety switch 560 turns off the high-energy light when the lid is opened while the high-energy light is on. However, visible light 510 can be emitted from the light source 450 when the lid is open. Specifically, the lid 410 can be fixed in an open position, such that visible light is reflected off of the reflective surface 440 at an angle at which an observer 550 would typically look at the reflective surface. While the visible light 510 emitted from the light source 450 is not polarized, i.e., contains light rays polarized in all directions, the reflective surface reflects more light polarized in the first direction. Specifically, light beam 520 is polarized within the drawing plane of FIG. 5 (or plane $P_{FO}$ in FIG. 9). By contrast, light polarized within a plane parallel to the reflective surface, i.e., perpendicularly to the drawing plane of FIG. 5 (or plane $P_{SO}$ in FIG. 9), is reflected to a lesser extent or not reflected at all. Observer 550, who could see the image or the animation displayed on the reflective surface before light source 450 was turned on, now sees a distracting reflection on the image that makes it harder or even impossible to view the image or animation. While the light source 450 is turned off, the observer sees the image or the animation as light beams 530 reaching the eye of the observer. Light beam 530 may indicate light that is reflected from another light source than light source 450, and is therefore not polarized or not polarized to the same extent than light beam 520. Additionally or alternatively, light beam 530 may indicate light emitted by the reflective surface embodied as a display screen.

The eyecare professional may now hand the customer a model glass 700 or a pair of spectacle glasses 600 that contain a polarizer 540, which is configured to absorb light polarized in the first direction. The customer places the polarizer in front of at least one eye while observing the image or the animation. Because reflected light 520 is (preferentially) polarized in the first direction, almost all or all of the reflected light is absorbed by the polarizer 540. As a result, the distracting reflection on the image or the animation is partially or completely removed, and the customer can properly view the image or the animation. The customer can place and remove the polarizer in front of his or her eyes any number of times to compare the visual experience with and without the added benefit of the polarizer. Thus, the customer can experience how a pair of spectacle glasses with a polarizer can improve his or her vision in circumstances, such as driving a car on a wet road, that could traditionally not be experienced during an eyeglass consultation.

Figure 6A:
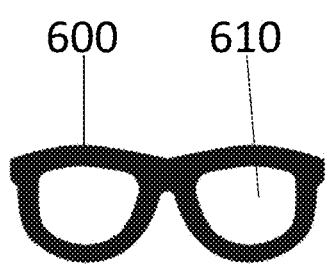
FIG. 6A shows a pair of spectacle glasses 600 with phototrope spectacle lenses 610 before exposure to UV-light or REV-light.
Figure 6B:
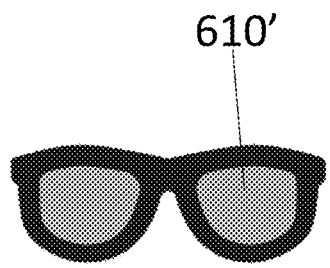
FIG. 6B shows a pair of spectacle glasses with phototrope spectacle lenses 610' after exposure to UV-light or REV-light.

FIG. 6A shows a pair of spectacle glasses 600 that contain spectacle lenses 610 having a polarizer 540 or a phototrope component. However, the eyecare professional may also provide a pair of spectacle glasses without polarizer or phototrope component for a side-by-side comparison of the optical properties and the visual appearance. When the spectacle glasses 600 contain spectacle lenses with a phototrope component, the spectacle lenses will self-tint and appear darker and transmit less light, as indicated by the tinted spectacle lenses 610' in FIG. 6B. When the spectacles lenses 610 contain a polarizer 540, they may be used to demonstrate the removal of distracting reflections described above. It is also possible to provide spectacle glasses in which the spectacle lenses include a polarizer 540 and a phototrope component.

Figure 7:
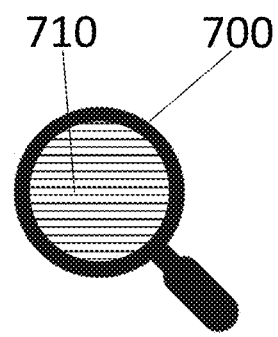
FIG. 7 shows a model glass 700 with a spectacle lens 710 having a polarizer 540.

FIG. 7 shows a model glass 700 with a spectacle glass 710, which may contain a polarizer 540 or a phototrope component. The model glass may be used to demonstrate the optical properties of the polarizer or the phototrope component, for example, to a customer who is wearing a pair of prescription glasses. Further, the eyecare professional may use, for example, several model glasses 700 for a side-by-side comparison of different spectacle glasses, such as spectacle glasses with different amounts of phototrope component that darken differently. Thus, the optical properties may be demonstrated while holding the model glass in front of the customer's prescription glasses.

Typically, the eyecare professional will ask a customer who is interested in purchasing new spectacle glasses questions about his or her viewing habits and/or lifestyle. Some of the answers provide information about the viewing habits and the lifestyle of the customer. It is also typical that the eyecare professional performs all the steps of the methods disclosed herein. However, the steps may also be performed by two or more people; for example, an employee of the eyecare professional may perform some of the steps, such as in setting up the demonstrational tool.

Questions about the customer's viewing habits that may be asked by the eyecare professional may include, but are not limited to, any of the following: Do you feel uneasy driving at night? Are you sensitive to light? Do you have to clean your glasses frequently? Are you sensitive to glare and reflections from the sun, for example from reflecting surfaces, such as a windshield or a wet road? Do you perform tasks that expose you to increased amounts of dust or debris, for example wood working? Do your current glasses leave pressure marks? Do your current glasses slide frequently?

Questions that may be asked concerning the lifestyle include, but are not limited to, any of the following: What is your profession? What kind of tasks do you perform at home, such as do you cook and if so, how much? What other tasks do you perform? Do you go to school or college? Do you pursue further education, such as post-grad studies? How do you commute, i.e., do you bike or drive a car or a motorcycle? What kinds of digital devices do you use, such as a smart phone, a tablet, or a personal computer? How much time do you spend in front of these digital devices? What are your hobbies? What kinds of sports do you play? Do you travel? How much time do you spend in the sun?

As part of the eyewear consultation process, the eyecare professional provides the demonstrational tool 400 to demonstrate optical properties of spectacle glasses. Specifically, the eyecare professional can now make a recommendation for one of the spectacle lenses that have been demonstrated with the demonstrational tool 400. In contrast to a recommendation made without the demonstration tool, the exemplary embodiment of a method of demonstrating optical properties as disclosed herein allows the eyecare professional to show the customer how the spectacle glasses perform in situations that could previously only be simulated with great difficulty, such as a demonstration of how spectacle glasses perform under bright sunlight. As a result, the recommendation becomes far less abstract because the customer can—instead of being told—experience the benefits of a particular spectacle lens.

Throughout this disclosure, the depiction of a certain order of steps in an exemplary embodiment of a method is solely provided for illustration purposes. However, unless explicitly noted otherwise, the method steps may also be performed in a different order. Additionally, at least some of the method steps may be performed to at least partly or completely overlap with other method steps. Further, any one step may be performed independently more than once.

In this disclosure, the term "and/or" in a list of items means that at least one item from the list is selected, but any number of items—including all of the items—can be present. If fewer than all items are selected, "and/or" is meant to encompass any possible combination or permutation of the selected items.

The foregoing description of the exemplary embodiments of the disclosure illustrates and describes the present invention. Additionally, the disclosure shows and describes only the exemplary embodiments, but, as mentioned above, it is to be understood that the disclosure is capable of being used in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents, and patent applications cited in this specification are herein incorporated by reference, and for any and all purposes, as if each individual publication, patent, or patent application were specifically and individually indicated to be incorporated by reference. In the case of inconsistencies, the present disclosure will prevail.

The invention claimed is:

1. A method of demonstrating an optical property of a spectacle lens comprising:
   providing a demonstrational tool including a light source, a closable compartment, a holder for at least one of a spectacle lens or a pair of spectacle glasses, and a reflective surface, the holder and the reflective surface being arranged within the closable compartment,
   placing the spectacle lens or the pair of spectacle glasses on the holder, exposing the spectacle lens or the pair of spectacle glasses to light emitted by the light source,
   absorbing a portion of the light emitted by the light source, and
   comparing an optical property of the spectacle lens before the exposure to the light emitted by the light source with the optical property of the spectacle lens during or after the exposure to the light emitted by the light source,
   wherein the portion of the light emitted by the light source includes at least one of ultraviolet (UV) light and high-energy visible (HEV) light, and
   wherein the reflective surface is configured to display at least one of an image and an animation.

2. The method according to claim 1, wherein the spectacle lens comprises a phototrope component,
   wherein the phototrope component absorbs the portion of the light emitted by the light source.

3. The method according to claim 2, wherein the phototrope component decreases a transmission of the spectacle lens when the portion of the light emitted by the light source is absorbed.

4. The method according to claim 3, wherein the optical property is the transmission of the spectacle lens.

5. The method according to claim 1, wherein the spectacle lens comprises a polarizer,
   wherein the light emitted by the light source is visible light,
   wherein the portion of the light that is absorbed is the visible light being polarized in a first orientation, and
   wherein the polarizer absorbs more of the light emitted by the light source being polarized in the first orientation than the light emitted by the light source in a second orientation being perpendicular to the first orientation.

6. The method according to claim 5,
   wherein the light emitted by the light source is reflected off of the reflective surface before being absorbed by the polarizer.

7. The method according to claim 6, wherein at least one of a still image and an animation is displayed on the reflective surface.

8. The method according to claim 6, wherein the reflective surface reflects light being polarized in the first orientation.

9. A method of providing customized eyewear to a consumer comprising:
   determining at least one of a consumer's viewing habits and a consumer's lifestyle,
   providing a selection of spectacle frames,
   letting the consumer select a spectacle frame, and
   performing an eyeglasses consultation, the eyeglasses consultation including:
   demonstrating the optical property of the pair of spectacle glasses according to claim 1.

10. The method according to claim 9, further comprising at least one of:
    measuring a visual acuity of the consumer, and
    centering a spectacle lens for the selected spectacle frame.

11. A demonstrational tool for demonstrating an optical property of a spectacle lens, the demonstrational tool comprising:
    a closable compartment,
    a holder for at least one of a spectacle lens or a pair of spectacle glasses, the holder being arranged within the closable compartment,
    a light source emitting visible light and at least one of UV-light or HEV light and being arranged within the closable compartment, and
    a reflective surface arranged within the closable compartment and being configured to display at least one of an image and an animation,
    wherein the holder is arranged to expose the spectacle lens or the pair of spectacle glasses to the at least one of UV-light or HEV light when the spectacle lens or the pair of glasses is placed on the holder and the closable compartment is closed,
    wherein the light source is arranged to reflect the visible light off of the reflective surface, and
    wherein the reflected light contains more of the visible light emitted by the light source being polarized in a first orientation than the visible light emitted by the light source in a second orientation being perpendicular to the first orientation.

12. The demonstrational tool according to claim 11, further comprising:
    a safety switch configured to turn off the at least one of the UV-light or the HEV light when the closable compartment is opened.

13. The demonstrational tool according to claim 11 wherein the reflective surface is a display screen, and
    wherein the display screen is oriented to reflect more light polarized in the first orientation than light polarized in the second orientation.

14. The demonstrational tool according to claim 11 further comprising:
    an inspection window for observing the spectacle lens or the pair of spectacle glasses when the spectacle lens or the pair of spectacle glasses is arranged on the holder and the closable compartment is closed.

15. The demonstrational tool according to claim 14 wherein the inspection window transmits at least some visible light and blocks the at least one of the UV-light or the HEV-light.

16. The demonstrational tool according to claim 11 further comprising:

a timer for turning off the at least one of the UV-light or the HEV-light after a pre-determined period of time.

\* \* \* \* \*